(12) United States Patent
Baek et al.

(10) Patent No.: US 12,336,541 B2
(45) Date of Patent: Jun. 24, 2025

(54) METHOD FOR PRODUCING MOLDED ARTICLE FOR WATER PURIFICATION

(71) Applicant: Sang Won Baek, Seoul (KR)

(72) Inventors: Sang Won Baek, Seoul (KR); Yong Jin Baek, Daegu (KR)

(73) Assignee: Sang Won Baek, Seoul (KR)

( * ) Notice: Subject to any disclaimer, the term of this patent is extended or adjusted under 35 U.S.C. 154(b) by 0 days.

(21) Appl. No.: 18/629,962

(22) Filed: Apr. 9, 2024

(65) Prior Publication Data

US 2024/0251797 A1  Aug. 1, 2024

(30) Foreign Application Priority Data

Apr. 28, 2023  (KR) .................. 10-2023-0055843

(51) Int. Cl.

| | | |
|---|---|---|
| *A01P 3/00* | (2006.01) | |
| *A01N 25/34* | (2006.01) | |
| *A01N 59/00* | (2006.01) | |
| *A01N 59/06* | (2006.01) | |
| *A01N 59/14* | (2006.01) | |
| *A01N 59/16* | (2006.01) | |
| *A01P 1/00* | (2006.01) | |
| *A01P 13/00* | (2006.01) | |

(52) U.S. Cl.
CPC ............. *A01N 59/00* (2013.01); *A01N 25/34* (2013.01); *A01N 59/06* (2013.01); *A01N 59/14* (2013.01); *A01N 59/16* (2013.01); *A01P 1/00* (2021.08); *A01P 3/00* (2021.08); *A01P 13/00* (2021.08)

(58) Field of Classification Search
CPC .... A01P 1/00; A01P 3/00; A01P 13/00; A01N 59/00; A01N 25/34; A01N 59/06; A01N 59/14; A01N 59/16; B01J 20/0248; B01J 20/30; B01J 20/10; B01J 37/00; C02F 1/68; C02F 2103/007; C02F 2305/10
USPC ........................................................ 264/134
See application file for complete search history.

(56) References Cited

FOREIGN PATENT DOCUMENTS

| | | |
|---|---|---|
| KR | 20060108281 A | 10/2006 |
| KR | 100807175 B1 | 2/2008 |
| KR | 100836527 B1 | 6/2008 |
| KR | 101265292 B1 | 5/2013 |
| KR | 101468929 B1 | 12/2014 |
| KR | 101658477 B1 | 9/2016 |
| KR | 20200127366 A | 11/2020 |
| KR | 102263219 B1 | 6/2021 |
| KR | 20220160920 A | 12/2022 |

OTHER PUBLICATIONS

English Translation of KR 10-1481730 (Year: 2015).*

* cited by examiner

*Primary Examiner* — Hannah J Pak
(74) *Attorney, Agent, or Firm* — NKL Law; Jae Youn Kim

(57) ABSTRACT

The present disclosure relates to a method for producing a molded article for water purification, including: preparing a natural mineral extract in an environmentally friendly manner; preparing a natural mineral-photocatalyst aqueous solution containing photocatalytic titanium dioxide ($TiO_2$) nano-powder dispersed in the natural mineral extract; and impregnating a plastic material with the natural mineral-photocatalyst aqueous solution under high-temperature and high-pressure conditions. The produced molded article may be installed on the surface of water or under water in lakes, reservoirs, ponds, rivers, aquariums, fish farms, swimming pools, water purification plants, and the like to adsorb and degrade organic substances, block the growth of bacteria and mold, and effectively reduce algal bloom.

3 Claims, 1 Drawing Sheet

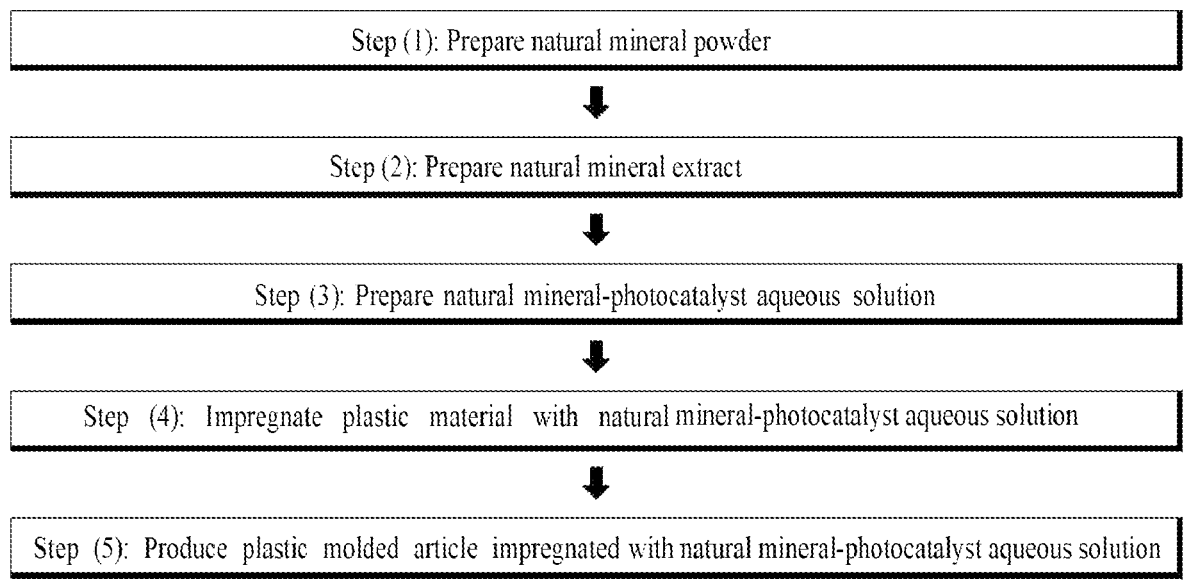

METHOD FOR PRODUCING MOLDED ARTICLE FOR WATER PURIFICATION

BACKGROUND

1. Technical Field

The present disclosure relates to a method of producing a molded article for water purification, and more specifically to a method of producing a molded article for water purification by impregnating a plastic material with a natural mineral-photocatalyst aqueous solution containing photocatalytic titanium dioxide ($TiO_2$) nanopowder dispersed in a natural mineral extract prepared in an environmentally friendly manner, wherein the molded article for water purification is able to not only adsorb and degrade organic substances contained in water in lakes, reservoirs, ponds, rivers, aquariums, fish farms, swimming pools, water purification plants, and the like, block the growth of bacteria and mold in the water, but also reduce algal bloom in the water.

2. Related Art

Due to rapid industrialization and urbanization, the inflow of organic matter, nitrogen, phosphorus, etc. from artificial pollutants such as domestic sewage, industrial wastewater, and agricultural and livestock wastewater continues to increase, and the resulting water pollution is becoming a major social problem The self-purification capacity of ecosystems to self-purify pollutants in water through natural forces has already exceeded its limit, and this may vary depending on the organic matter content of the incoming pollutant, the size of the river, flow speed, and weather, but recently, algal bloom has caused serious problems in the use of water resources.

In general, the term "algal bloom" refers to a phenomenon in which green algae or blue-green algae, which are phytoplankton, increase significantly in eutrophic lakes or slow-flowing rivers, changing the color of the water to green. When the surface of such a water body is covered with green algae, the entry of sunlight into the water is blocked, and the amount of dissolved oxygen in the water is reduced as additional dissolved oxygen does not flow into the water. When this happens, fish and aquatic life die, bad odors are created, and the ecosystem of the water area is destroyed, causing many problems in social, economic, and environmental aspects.

The term "green algae" refers to a group of plants that contain chlorophyll-a and -b, giving them a green color, like land plants, and whose vegetative cells are directly converted into reproductive cells or whose reproductive organs are simple, and which mainly live in water. Blue-green algae are prokaryotes that are classified as bacteria, not as algae, and perform photosynthesis. They live wherever there is land and water. They are found in various ecosystems and use phosphorus (P) and nitrogen (N) as major nutrients.

Algal bloom is of great social interest in terms of aesthetics and a value as a water source or agricultural water, but experts have slightly different opinions on the causes of algal bloom. Blue-green algae, which greatly contribute to algal bloom, are primary producers that can occur at any time in the presence of appropriate light and nutrients required for photosynthesis and at appropriate water flow rate. Thus, algal bloom has recently occurred frequently in lakes, rivers, coasts, etc. around the world.

According to research to date, nutrient salts dissolved in water, abnormal temperatures due to warming, hydraulic factors, light penetration, changes in the diet of predators, mass reproduction of microorganisms such as bacteria or viruses, etc. are pointed out as the causes of algal bloom. However, algal bloom is not caused by any one factor but is caused by the interaction of various factors as described above, and thus major factors that cause algal bloom are manifested unexpectedly and differently depending on the physical and physicochemical characteristics of the target water body.

Accordingly, various methods have been attempted to date to reduce green and red tides in lakes, rivers, and coastal waters such as marine cage fish farms, but have relied mainly on physical and chemical methods such as spraying red clay and coagulants. In addition, various control methods such as photocatalysis, ultrasonic treatment, ozone treatment, and microbiological methods have been implemented singly or in combination.

However, most of the above-mentioned conventional methods exhibit only a temporary effect, have the problem of incurring excessively high costs compared to the control effect, and as a result, cause considerable secondary damage to the environment.

Regarding conventional arts relating to water purification, Korean Patent No. 10-0807175 discloses a method for producing a bioceramic for water purification, including: a process of mixing 100 parts by weight of natural mineral powder, which contains 20 to 30 wt % of zeolite, 20 to 30% by weight of clay or red clay, and 40 to 60 wt % by weight of germanium barley stone, with 15 to 25 parts by weight of an antioxidant fermented microbial solution, obtained by inoculating and fermenting photosynthetic bacteria, lactic acid bacteria, and yeast in a microbial culture medium containing nutrients to produce organic acids such as oxalic acid, citric acid, acetic acid, succinic acid, and malic acid, which have antioxidant properties, and aging the mixture so that the antioxidant fermented microbial solution penetrates the natural mineral powder; a process of molding the aged mixture of the natural mineral powder and the antioxidant fermented microbial solution into a certain shape; a process of drying the molded mixture to remove water; and a process of calcining the dried molded mixture at 500 to 650° C. for 40 to 80 minutes.

Furthermore, Korean Patent No. 10-0836527 relates to technology for applying a composition for removing red algae, green algae, and diatoms to an algae outbreak area using a porous nano-particle titania photocatalyst, the photocatalyst including: 10 to 90 parts by weight of porous titania nanoparticles having an average particle diameter of 10 to 500 nm; and 90 to 10 parts by weight of porous mineral powder having an average particle diameter of 10 to 100 μm.

In addition, Korean Patent No. 10-1658477 discloses a method for producing a floating body for controlling green/red tides, including steps of: preparing a coating solvent containing a photocatalyst; coating a floating member with the photocatalyst; post-treating the photocatalyst-coated floating member by immersing the same in distilled water; and taking the floating member out of the distilled water, followed by drying. Korean Patent Application Publication No. 10-2020-0127366 discloses that a floating photocatalyst includes a floating body formed of expanded polystyrene (EPS), which has a lower density than water, and titanium dioxide ($TiO_2$) nanoparticles fixed to the surface of the floating body, and this photocatalyst is able to photodegrade pollutants in a state in which it floats on the water surface.

Meanwhile, the inventors of the present disclosure have produced an environmentally friendly plastic molded article for water purification, designed to adsorb and degrade organic substances, block the growth of bacteria and mold, and reduce algal bloom, by applying technology related to Korean Patent No. 10-1265292 (entitled "Method for producing far-infrared ray-emitting solution and far-infrared ray-emitting article produced therefrom) and Korean Patent No. 10-1468929 (entitled "Masterbatch containing functional substances and production method therefor"), held by the present applicant, and grafting photocatalytic titanium dioxide nanotechnology onto the above-described technology, thereby completing the present disclosure.

PRIOR ART DOCUMENTS

Patent Documents (Patent Document 1) Korean Patent No. 10-0807175 (Published on Feb. 27, 2008)
(Patent Document 2) Korean Patent No. 10-0836527 (published on Jun. 10, 2008)
(Patent Document 3) Korean Patent No. 10-1658477 (published on Sep. 22, 2016)
(Patent Document 4) Korean Patent Application Publication No. 10-2020-0127366 (laid open on Nov. 11, 2020)

SUMMARY

An object of the present disclosure is to provide a method of producing a molded article for water purification by preparing a natural mineral extract in an environmentally friendly manner, preparing a natural mineral-photocatalyst aqueous solution containing photocatalytic titanium dioxide nanopowder dispersed in natural mineral extract, and impregnating a plastic material with the natural mineral-photocatalyst aqueous solution under high-temperature and high-pressure conditions, wherein the molded article may be installed on the surface of water or under water in lakes, reservoirs, ponds, rivers, aquariums, fish farms, swimming pools, water purification plants, and the like to adsorb and degrade organic substances, block the growth of bacteria and mold, and effectively reduce algal bloom.

A method for producing a molded article for water purification according to the present disclosure includes the following sequential steps: (1) preparing natural mineral powder by pulverizing a natural mineral mixture, which contains 5 to 15 wt % of red clay, 5 to 15 wt % of volcanic ash, 25 to 35 wt % of barley stone, 25 to 35 wt % of granophyre, and 15 to 25 wt % of tourmaline, to a size of 325 mesh or less; (2) preparing a natural mineral extract by adding the natural mineral powder, prepared in step (1), to a 2- to 5-fold weight of purified water to obtain a natural mineral powder aqueous solution, grinding the natural mineral powder by a ball mill for 24 to 48 hours, and then precipitating a solid from the natural mineral powder aqueous solution, followed by separating a colloidal transparent supernatant, containing natural minerals dissolved in purified water, from the solid; (3) preparing a natural mineral-photocatalyst aqueous solution by dispersing 1 to 10 parts by weight of titanium dioxide ($TiO_2$) nanopowder having a particle size of 1 to 100 nm in 100 parts by weight of the natural mineral extract prepared in step (2); (4) impregnating a plastic material having a particle size of 1 to 10 mm with the natural mineral-photocatalyst aqueous solution, prepared in step (3), by spraying the natural mineral-photocatalyst aqueous solution in a high-temperature and high-pressure closed container charged with the plastic material; and (5) producing a plastic molded article having a predetermined shape from the plastic material impregnated with the natural mineral-photocatalyst aqueous solution in step (4).

According to a preferred embodiment of the present disclosure, step (4) includes spraying the natural mineral-photocatalyst aqueous solution in the closed container at a temperature of 80 to 120° C. and a pressure of 3 to 6 bar for 1 to 10 minutes, followed by cooling at room temperature (15 to 25° C.), the plastic molded article produced in step (5) is in the form of a plate or hollow sphere having a specific gravity in the range of 0.9 to 1.5, and the plastic molded article in the form of a hollow sphere has 2 to 6 water-circulation holes formed therethrough.

The method for producing a molded article according to the present disclosure has the following effects.

As the natural mineral extract is prepared in an environmentally friendly manner, heavy metals or foreign substances contained in the minerals themselves are not incorporated in the natural mineral extract. In addition, as the natural mineral-photocatalyst aqueous solution containing titanium dioxide ($TiO_2$) nanopowder dispersed in the natural mineral extract is impregnated into the plastic material under high-temperature and high-pressure conditions and then cooled at room temperature, aggregates composed of natural minerals and titanium dioxide may be semi-permanently impregnated into the plastic material.

As the molded article for water purification produced as described above may be installed on the surface of water or under water and may maintain its function for a long period of time, it may perform water purification function at low costs not only by adsorbing and degrading organic substances contained in the water body, but also by blocking the growth of bacteria and mold effectively in the water and reducing algal bloom. Furthermore, it is possible to improve the surrounding aesthetics by designing the structure and color of the molded article to match the natural environment.

BRIEF DESCRIPTION OF THE DRAWINGS

FIG. 1 is a process flow diagram showing a method for producing a molded article for water purification according to the present disclosure.

DETAILED DESCRIPTION

Hereinafter, the method for producing a molded article for water purification according to the present disclosure will be described in detail. However, the following description is intended merely to illustrate the present disclosure so that a person skilled in the art can easily carry out the present disclosure, and the technical idea and scope of the present disclosure are not to be construed as being limited by the following description.

As shown in FIG. 1, the method for producing a molded article for water purification according to the present disclosure includes steps of: (1) preparing natural mineral powder by pulverizing a natural mineral mixture, which contains 5 to 15 wt % of red clay, 5 to 15 wt % of volcanic ash, 25 to 35 wt % of barley stone, 25 to 35 wt % of granophyre, and 15 to 25 wt % of tourmaline, to a size of 325 mesh or less; (2) preparing a natural mineral extract by adding the natural mineral powder, prepared in step (1), to a 2- to 5-fold weight of purified water to obtain a natural mineral powder aqueous solution, grinding the natural mineral powder by a ball mill for 24 to 48 hours, and then precipitating a solid from the natural mineral powder aqueous solution, followed by separating a colloidal transparent supernatant, containing natural minerals dissolved in purified water, from the solid; (3) preparing a natural mineral-photocatalyst aqueous solution by dispersing 1 to 10 parts by weight of titanium dioxide ($TiO_2$) nanopowder having a particle size of 1 to 100 nm in 100 parts by weight of the natural mineral extract prepared in step (2); (4) impregnating a plastic material having a particle size of 1 to 10 mm with the natural mineral-photocatalyst aqueous solution, prepared in step (3), by spraying the natural mineral-photocatalyst aqueous solution in a high-temperature and high-pressure closed container charged with the plastic material; and (5) producing a plastic molded article having a predetermined shape from the plastic material impregnated with the natural mineral-photocatalyst aqueous solution in step (4).

Step (1) is a process of preparing natural mineral powder by pulverizing a natural mineral mixture, which contains 5 to 15 wt % of red clay, 5 to 15 wt % of volcanic ash, 25 to 35 wt % of barley stone, 25 to 35 wt % of granophyre, and 15 to 25 wt % of tourmaline, to a size of 325 mesh or less. As the natural mineral mixture, which contains red clay, volcanic ash, barley stone, granophyre, and tourmaline mixed together at a suitable ratio, is pulverized to a size of 325 mesh (about 44 μm) or less, harmful substances and heavy metals therein are easy to remove. In addition, as the natural mineral powder has a neutral to slightly alkaline pH of about 7 to 8, it may be used as an environmentally friendly material that is not harmful to the human body at all.

Red clay (loess) is generally composed of 50 to 60 wt % of silica ($SiO_2$), 8 to 12 wt % of alumina ($Al_2O_3$), 2 to 4 wt % of ferric oxide ($Fe_2O_3$), 0.8 to 1.1 wt % of ferrous oxide (FeO), about 0.5 wt % of titanium dioxide ($TiO_2$) and manganese oxide (MnO), 4 to 16 wt % of calcium oxide (CaO), 2 to 6 wt % of magnesium oxide (MgO), etc. Red clay is known to exhibit effects such as far-infrared radiation, heavy metal adsorption, antibacterial and deodorizing effects, and volatile substance removal, and the like. Research results suggest that the reason why red clay is rich in soil nutrient despite its relatively low organic matter content is because of its high cation exchange capacity and permeability.

The term "volcanic ash" refers to fine particles smaller than 2 to 4 mm in size among volcanic eruptions consisting of lava fragments, mineral particles, glass fragments, etc. Volcanic ash is rich in minerals necessary for plant growth, such as potassium, sodium, and phosphorus, and thus acts as a natural fertilizer. In addition, volcanic ash has excellent cation exchange ability and anion generation ability, and thus it weathers slowly and creates fertile soil good for plant growth. Based on these actions, volcanic ash is also used as a cement mixing material in the civil engineering field.

Barley stone belongs to the granite family according to the geological classification, and examples thereof include quartz porphyry, feldspar porphyry, and granite porphyry. Barley stone is a dense mixture of quartz and feldspar, has 30,000 to 150,000 pores per 1 $cm^3$, and thus has strong adsorption properties. It contains about 25,000 types of inorganic salts. Barley stone contains anhydrous silicic acid ($SiO_2$) and aluminum oxide ($Al_2O_3$) as main components. Barley stone also contains a small amount of ferric oxide ($Fe_2O_3$), which acts to exchange ions with heavy metals, and thus it is also used as an agent for removing harmful metals. Barley stone is known to emit far-infrared rays when heated, and this characteristic is widely used in various industrial fields, including as saunas and medical devices.

Granophyre is a fine-grained granite with a granophyric texture, and the porphyry rock shows a texture in the ground mass. Granophyre is helpful in forming basic natural minerals because it is composed of crystals made from the final fraction during crystallization of basic magma.

Tourmaline is very abundant and has the best-developed crystals in pegmatites and in metamorphosed limestones in contact with granitic magmas. Because tourmaline is resistant to weathering, it accumulates in detrital deposits and is used as jewelry. In addition, tourmaline is also employed in pressure devices because of its piezoelectric properties, that is, its ability to generate electric charge under mechanical stress or its change in shape when voltage is applied. In the present disclosure, tourmaline is mixed in an amount of 15 to 25 wt % based on the total weight of the natural minerals to enhance the ability to capture cations in water.

The natural minerals mixed to have the above-described composition are formulated to have a neutral to slightly alkaline pH within 7 to 8, and thus do not cause environmental pollution. As these natural minerals are pulverized to a particle size of 325 mesh (about 44 μm), they are prepared into natural mineral powder having an excellent ability to emit far-infrared rays and generate anions and excellent ion exchange ability (cation substitution ability). As the above-described natural minerals are effective in removing heavy metals, providing good sleep, deodorizing, preventing mold growth, and purifying water and air, they are also used as housing and building materials.

Next, step (2) is a process of preparing a natural mineral extract by adding the natural mineral powder, prepared in step (1), to a 2- to 5-fold weight of purified water to obtain a natural mineral powder aqueous solution, grinding the natural mineral powder by a ball mill for 24 to 48 hours, and then precipitating a solid from the natural mineral powder aqueous solution, followed by separating a colloidal transparent supernatant, containing natural minerals dissolved in purified water, from the solid. This step is performed to remove heavy metals and foreign substances contained in the natural mineral powder, prepared in step (1), by precipitating them as a solid, and at the same time, to prepare a natural mineral extract in a colloidal state that may be easily impregnated into a plastic material.

The natural mineral extract is in a flowable sol state in which dispersoids (colloidal particles; particle diameter: about 0.1 μm) are dispersed in purified water as a dispersion medium. Here, when the dispersion medium is water, the sol is referred to as "hydrosol", and when the dispersion medium is an organic solvent, the sol is referred to as "organosol". The natural mineral extract obtained as the supernatant is a hydrophilic colloid in a hydrosol state, is charged by adsorbing ions in an aqueous solution as a dispersion medium or by dissociation of ionizing groups present on the particle surface, and exists in a homogeneous state by being stabilized by the electrostatic action of the charges.

The natural mineral powder ground by a ball mill as described above may be separated into a precipitate and a supernatant by about 24 to 48 hours of precipitation depending on the particle size distribution, but may also be separated into a precipitate and a supernatant within a short time by a centrifugal device. In addition, the particle size of natural minerals (dispersoids) contained in the colloidal transparent supernatant was found to be within 0.001 to 10 μm (1 to 1,000 nm).

Large amounts of metallic cations contained in the natural minerals (dispersoids) not only exert an ionic adsorption effect on the negatively charged cell walls of green algae bacteria, but also penetrate the bacterial cells by endocytosis and collapse the cell walls by the strong oxidizing power of the cations that penetrated the cells. In addition, the metallic cations have been studied to inhibit cellular energy metabolism by binding to the amino acid cysteine (—SH) of cells, and to inhibit DNA replication by reacting with the nucleotide sequence of intracellular DNA (see Antimicrobial Polymers with Metal Nanoparticles, (2015)).

In addition, purified water (or ultrapure water) that is used in the present disclosure refers to water obtained by distilling tap water or purifying tap water through ion exchange resin. Since purified water is in a state in which all impurities such as dissolved ions, solid particles, microorganisms, organic matter, and dissolved gases contained therein have been removed, it may increase the cation content and purity of the natural mineral extract.

The natural mineral extract (containing a mixture of red clay, volcanic ash, barley stone, granophyre, and tourmaline at a weight ratio of 10:10:30:30:20, and purified water in an amount three times the total weight of the mixture) was measured for its far-infrared emissivity and radiant energy by the Korea Institute of Far Infrared Applied Estimation (address: 173, Seokchon-Dong, Songpa-Gu, Seoul, Korea) affiliated with the Korea Far Infrared Association. As a result, as shown in Table 1 below, it could be confirmed that the far-infrared emissivity (at 5 to 20 μm) compared to the black body reached 0.893 and the radiant energy (W/m$^2$·μm) reached $3.44 \times 10^2$.

TABLE 1

| Emissivity | Radiant energy (W/m$^2$ · μm, 37° C.) | Test method |
| --- | --- | --- |
| 0.893 | $3.44 \times 10^2$ | KFIA-FI-1005 |

Step (3) is a process of preparing a natural mineral-photocatalyst aqueous solution by dispersing 1 to 10 parts by weight of titanium dioxide ($TiO_2$) nanopowder having a particle size of 1 to 100 nm in 100 parts by weight of the natural mineral extract prepared in step (2). Titanium dioxide ($TiO_2$), which has been widely used as a photocatalyst material, has advantages over other materials in that it is inexpensive, has excellent durability and wear resistance as a photocatalyst, and is also harmless and safe to the human body. In addition, materials that may be used as photocatalysts include $ZnO$, $ZrO_2$, $WO_3$, and perovskite-type complex metal oxides.

Titanium dioxide ($TiO_2$) may be used semi-permanently because it does not change even when exposed to light, and is advantageous from an economic perspective because it has excellent durability and wear resistance. In addition, it is known that titanium dioxide ($TiO_2$) has a higher oxidizing power than chlorine ($Cl_2$) or ozone ($O_3$), and thus has excellent sterilizing power and has the ability to degrade all organic substances into carbon dioxide and water.

For reference, the term "photocatalyst" refers to a catalyst that increases the rate of photoreaction by absorbing light. In other words, when a material used as a photocatalyst, such as titanium dioxide ($TiO_2$), is irradiated with light, electrons (e−) and holes (particles that behave like electrons with a positive charge) are generated on the surface, and the electrons react with oxygen on the surface of the photocatalyst to produce superoxide anions ($O^{2-}$).

In addition, the holes react with water to produce hydroxyl radicals (neutral OH). The hydroxyl radicals produced at this time has an excellent ability to oxidize and degrade organic substances, and thus they can degrade odorous substances, viruses, bacteria, etc. existing in the air or water into water and carbon dioxide. Photocatalytic reactions using this action are widely used in purification processes to remove pollutants in the air or water.

Among conventional methods that employ titanium dioxide photocatalyst powder in the water treatment field, a method that uses nanometer (nm)-sized photocatalyst powder is highly efficient, but has a problem in that it is difficult to recover the photocatalyst powder after water treatment, and thus a recovery process is additionally required after the water treatment process. For this reason, in recent years, immobilization methods of immobilizing a photocatalyst on a support have been developed. In general, an immobilized type in which glass fiber or a quartz tube is coated with a photocatalyst is applied, or a fluidized type in which a support is coated with a photocatalyst is applied.

However, immobilized-type photocatalyst carriers are easy to install and operate, but have problems in that they show low treatment efficiency due to their small specific surface area, or the photocatalyst is detached during an oxidation reaction because the photocatalyst is attached using an organic support and an adhesive, and the support and adhesive are degraded. In addition, inorganic hollow beads loaded with micrometer (μm)-sized photocatalysts as fluidized photocatalysts have the disadvantage of being excessively expensive.

To overcome these disadvantages, the present disclosure provides a method of producing a molded article, that is, an immobilized-type natural mineral-photocatalyst molded article, which is produced through a process of impregnating a plastic material with a natural mineral aqueous solution obtained by dispersing 1 to 10 parts by weight of the photocatalyst titanium dioxide ($TiO_2$) in a colloidal natural mineral extract, and which is able to exert the function of the natural mineral-photocatalyst until the life of the support thereof is over, thereby adsorbing and degrading organic substances in water, blocking the growth of bacteria and mold, and reducing algal bloom.

As 1 to 10 parts by weight of the titanium dioxide nanopowder is dispersed in 100 parts by weight of the natural mineral extract, the resulting natural mineral-photocatalyst aqueous solution is stably maintained as a hydrophilic colloid in a hydrocolloid state, and thus is effectively impregnated into a plastic material later and is suitable for functioning as a natural mineral-photocatalyst nanopowder complex.

Step (4) is intended to implement the above-described function and is a process of impregnating a plastic material having a particle size of 1 to 10 mm with the natural mineral-photocatalyst aqueous solution, prepared in step (3), by spraying the natural mineral-photocatalyst aqueous solution in a high-temperature and high-pressure closed container charged with the plastic material.

In step (4), the natural mineral-photocatalyst aqueous solution may be effectively impregnated into a plastic material having a particle size of 1 to 10 mm by spraying the natural mineral-photocatalyst aqueous solution in the closed container at a temperature of 80 to 120° C. and a pressure of 3 to 6 bar for 1 to 10 minutes. Then, the resulting plastic material impregnated with the natural mineral-photocatalyst aqueous solution is cooled at room temperature (15 to 25° C.) and dried to remove water, and thus the natural mineral-photocatalyst nanopowder complex is aggregated and fixed (set) semi-permanently within the plastic material. According to the present disclosure, it is possible to maximize the impregnation amount of the natural mineral-photocatalyst aqueous solution by controlling the particle size distribution and the conditions of the process in the closed container within predetermined ranges, and thus there is no strict limit on the type of the plastic material itself.

However, it has been found that, when resins that can be deformed by heat are used, including crystalline thermoplastic resins such as polyethylene (HDPE, LDPE, etc.), polypropylene (PP), nylon, polyacetal, etc., and amorphous thermoplastic resins such as polyvinyl chloride (PVC) resin, polystyrene (PS), ABS resin, acrylic resin, etc., the workability is good, the production cost may be reduced, and a high concentration of the natural mineral-photocatalyst aqueous solution may be easily impregnated into the plastic materials, that is, between polymer segments of the plastic materials.

Finally, step (5) is a process of producing a plastic molded article having a predetermined shape from the plastic material impregnated with the natural mineral-photocatalyst aqueous solution in step (4). In this step, the thermoplastic resin selected as described above may be molded in the form of a plate or hollow sphere having a specific gravity in the range of 0.9 to 1.5. Accordingly, the molded article for water purification may be stably installed on the surface of water or under water and may maintain its function for a long period of time, and thus it may perform good water purification function even at low costs. Furthermore, it is possible to improve the surrounding aesthetics by designing the structure and color of the molded article to match the natural environment.

The plastic molded article in the form of a hallow sphere was named "green ball" to mean that it performs the function of purifying the hydrosphere in the natural environment. When two to six water-circulation holes may be formed in the surface of the plastic molded article in the form of a hallow sphere, water circulation between the inside and outside of the hollow sphere may be facilitated. This can enhance the function of purifying water by adsorbing and degrading organic substances, blocking the growth of bacteria and mold, and reducing algal bloom. In addition, in this case, interconnection between the molded articles may be easy, and a molded article structure with a unique shape may be formed.

As described above, the molded article for water purification produced according to the present disclosure has been completed through numerous experiments. Hereinafter, the present disclosure will be described by way of preferred examples so that the present disclosure can be easily understood and implemented by those skilled in the art.

EXAMPLE

Step (1): A natural mineral mixture obtained by mixing red clay, volcanic ash, barley stone, granophyre, and tourmaline at a ratio of 10:10:30:30:20 wt %, respectively, were pulverized to a particle size of 325 mesh (about 44 μm), thus preparing natural mineral powder.

Step (2): 100 parts by weight of the natural mineral powder prepared in step (1) was added to 300 parts by weight of purified water as a solvent, and ground by a ball mill for 48 hours. Next, a solid was precipitated from the solution for 24 hours, and then a colloidal transparent supernatant containing the natural minerals dissolved in purified water was separated from the solid, thereby preparing a natural mineral extract.

Step (3): 5 parts by weight of titanium dioxide ($TiO_2$) nanopowder having a particle size of 1 to 100 nm was dispersed in 100 parts by weight of the natural mineral extract prepared in step (2), thereby preparing a natural mineral-photocatalyst aqueous solution.

Step (4): The natural mineral-photocatalyst aqueous solution prepared in step (3) was sprayed in a high-temperature and high-pressure closed container (95° C. temperature and 3 bar pressure) charged with a plastic material (HDPE resin) having a particle size of 1 to 10 mm, thereby impregnating the plastic material with the natural mineral-photocatalyst aqueous solution, and then the resulting plastic material impregnated with the natural mineral-photocatalyst aqueous solution was cooled at room temperature.

Step (5): The plastic material (HDPE resin) impregnated with the natural mineral-photocatalyst aqueous solution in step (4) was molded in the form of a sphere having a diameter of 25 to 28 cm and a thickness of 3 mm, and four water-circulation holes, each having a diameter of 3 mm, were formed through the sphere, thereby producing a molded article (green ball) for water purification.

Test Example 1

The results of a test conducted to evaluate the algae removal efficiency of the molded article for water purification produced in the above Example are shown in Table 2 below.

Example 2

| | | Algal cell count (cells/mL) | | |
|---|---|---|---|---|
| Concentration used (g) | Reaction time (h) | Initial group (control) | After application (specimen) | Algae growth inhibition rate (%) |
| 159.2 | 0 | 12,400 | 12,400 | — |
| | 24 | 34,800 | 1,100 | >100 |
| | 48 | 98,200 | 600 | >100 |
| | 72 | 280,000 | 400 | >100 |

Test method: According to Ministry of Environment Regulation No. 697, Annex 1 "Algae removal efficiency and ecotoxicity evaluation method".

Concentration used: The total weight of 12 pieces applied (average surface of one piece: 38.47 $cm^2$).

As can be seen from the test results in Table 2, the molded article for water purification produced according to the method of the present disclosure exhibited a decrease by 91% in the algal cell count (cells/mL) after 24 hours and a decrease by 97% in the algal cell count after 72 hours, and also exhibited an algae growth inhibition rate exceeding 100%. On the other hand, the control group showed an approximately an about 23-fold increase in the algal cell count 72 hours after the start of the test.

Test Example 2

The results of a test conducted to evaluate the ecotoxicity of the molded article for water purification produced in the above Example are shown in Table 3 below. As can be seen in Table 3, it was found that the molded article was not toxic to the ecosystem.

TABLE 3

| Test item | Reaction time | Unit | Test result | Test method |
|---|---|---|---|---|
| Ecotoxicity using luminescent bacteria | 24 h after application | $TU_B$ | 0.0 | ES 04706.1 |
| | 48 h after application | $TU_B$ | 0.0 | ES 04706.1 |
| | 72 h after application | $TU_B$ | 0.0 | ES 04706.1 |
| Fish ecotoxicity | 24 h after application | TU | 0.0 | OECD TG.203 |
| | 48 h after application | TU | 0.0 | OECD TG.203 |
| | 72 h after application | TU | 0.0 | OECD TG.203 |
| Ecotoxicity using Daphnia | 24 h after application | TU | 0.0 | ES 04704.1b |
| | 48 h after application | TU | 0.0 | ES 04704.1b |
| | 72 h after application | TU | 0.0 | ES 04704.1b |

Concentration used: 1,053 cm$^2$/L (average surface area of one piece: 79.0 cm$^2$;
average weight of one piece: 5.6 g)

Test Example 3

For the Korea Rural Community Corporation's water quality improvement verification test for the molded article for water purification produced in the above Example, the test was conducted by installing the molded article structure in Geumbong Reservoir located in Geumpo-ri, Nongong-eup, Dalseong-gun, Daegu-si, Korea. The test results are shown in Table 4 below.

TABLE 4

| | Before installation | After 1 month | After 2 months | After 3 months | After 4 months | After 5 months |
|---|---|---|---|---|---|---|
| Chl-a (mg/m$^3$) | 101.4 | 44.1 | 52.5 | 86.4 | 17.2 | 68.5 |
| TOC (mg/L) | 9.5 | 4.7 | 6.7 | 6.5 | 5.4 | 6.7 |

Chl-a concentration: total algae biomass (chlorophyll).
TOC: Total Organic Carbon (TOC) is the amount of all organic compounds, which can be oxidized in water expressed, as the amount of carbon.

From the test results in Table 4 above, it can be confirmed that the molded article for water purification produced according to the method of the present disclosure was able to exhibit water quality improvement effects corresponding to a decrease by 56% in Chl-a and a decrease by 51% in TOC within in 1 month after installation, and exhibited water quality improvement effects corresponding to an average decrease by about 51% in Chl-a and an average decrease by about 34% in TOC over a test period of 5 months, suggesting that the molded article water purification is able to reduce the occurrence of green algae over a long period of time because the natural mineral-photocatalyst nanopowder complex is aggregated and semi-permanently fixed within the plastic material.

Therefore, the molded article for water purification produced according to the present disclosure may be used in various applications and forms without departing from the technical spirit of the present disclosure not only for the purpose of reducing algal bloom by adsorbing and degrading organic substances contained in water in lakes, reservoirs, ponds, rivers, aquariums, fish farms, swimming pools, water purification plants, etc. and blocking the growth of bacteria and mold in the water, but also for the purpose of purifying the sea water surface in which a red tide phenomenon (a phenomenon in which sea water turns red due to the explosive growth of certain algae) has occurred.

The invention claimed is:

1. A method for producing a molded article for water purification, comprising the steps of:
   (1) preparing natural mineral powder by pulverizing a natural mineral mixture, which contains 5 to 15 wt % of red clay, 5 to 15 wt % of volcano ash, 25 to 35 wt % of barley stone, 25 to 35 wt % of granophyre, and 15 to 25 wt % of tourmaline, to size of 325 mesh or less;
   (2) preparing a natural mineral extract by adding the natural mineral powder, prepared in step (1), to a 2- to 5-fold weight of purified water to obtain a natural mineral powder aqueous solution, grinding the natural mineral powder by a ball mill for 24 to 48 hours, and then precipitating a solid from the natural mineral powder aqueous solution, followed by separating a colloidal transparent supernatant, containing natural minerals dissolved in the purified water, from the solid;
   (3) preparing a natural mineral-photocatalyst aqueous solution by dispersing 1 to 10 parts by weight of titanium dioxide (TiO$_2$) nanopowder having a particle size of 1 to 100 nm in 100 parts by weight of the natural mineral extract prepared in step (2);
   (4) impregnating a plastic material having a particle size of 1 to 10 mm with the natural mineral-photocatalyst aqueous solution, prepared in step (3), by spraying the natural mineral-photocatalyst aqueous solution in a closed container charged with the plastic material at a temperature of 80 to 120° C. and a pressure of 3 to 6 bar, followed by cooling at room temperature of 15 to 25° C.; and
   (5) producing a molded article having a predetermined shape from the plastic mineral impregnated with the natural mineral-photocatalyst aqueous solution in step (4).

2. The method of claim 1, wherein the plastic molded article produced in step (5) is in the form of a plate or hollow sphere having a specific gravity in the range of 0.9 to 1.5.

3. The method of claim 2, wherein the plastic molded article in the form of the hollow sphere has 2 to 6 water-circulation holes formed therethrough.

* * * * *